Nov. 29, 1966     P. F. HAYNER ET AL     3,287,982
GYROSCOPE

Filed Feb. 23, 1960     5 Sheets-Sheet 1

Paul F. Hayner
Kenneth E. Mayo
*INVENTORS*

Paul F. Hayner
Kenneth E. Mayo
*INVENTORS*

Paul F. Hayner
Kenneth E. Mayo
INVENTORS

Nov. 29, 1966  P. F. HAYNER ET AL  3,287,982
GYROSCOPE

Filed Feb. 23, 1960  5 Sheets-Sheet 4

Paul F. Hayner
Kenneth E. Mayo
INVENTORS

Paul E. Hayner
Kenneth E. Mayo
INVENTORS

United States Patent Office 3,287,982
Patented Nov. 29, 1966

3,287,982
GYROSCOPE
Paul F. Hayner and Kenneth E. Mayo, Nashua, N.H., assignors to Sanders Associates, Inc., Nashua, N.H., a corporation of Delaware
Filed Feb. 23, 1960, Ser. No. 10,386
10 Claims. (Cl. 74—5.7)

The invention relates generally to gyroscopes employed in modern guidance instruments, guided missiles, and the like. More particularly, the invention is directed to fluid pressure actuated gyroscopes that are of small size, light in weight, and economical to manufacture. While the invention is subject to a wide range of applications, it is especially suited for use in missile guidance systems and will be particularly described in that connection.

In modern guidance systems of the single operational use variety, such as built into guided missiles, the need for providing simple, inexpensive, and yet highly reliable components is readily apparent. More particularly, missiles intended for "short range" operation are produced in large quantities; hence, the cost of such missiles and components should be minimized. Furthermore, for missiles in this category components should be capable of storage for indefinite periods of time, capable of becoming operational in an extremely short period of time, and of functioning during the missile flight.

A gyroscope intended for use in this type environment thus should be relatively inexpensive, capable of attaining sufficient speeds for providing gyroscopic action in a short period of time and being stored for periods of time as long as five years. The gyro rotor rotation must be initiated in a short time e.g. (.01 second) and come up to a predetermined speed within a short time thereafter e.g. (0.5 second). After reaching a predetermined speed, the rotor speed should be maintained at a useful level for a relatively long period of time e.g., 5 minutes. The gyroscope should be capable of repeated pretesting prior to intended use for check-out purposes without degrading its operation or contaminating its parts.

Various attempts to solve the above-mentioned problems have included gyroscopes which are electrically driven, spring driven, and gyroscopes driven by the products of combustion of an explosive charge. An electrically driven gyroscope is relatively high in cost and very complex in nature. This type of gyroscope is usually carried in a running condition so as to be at speed prior to the firing of the missile. The explosive type of gyroscope, on the other hand, although less expensive to manufacture than the electrically driven gyroscope, has serious drawbacks in performance. Upon releasing the explosive charge, there is a tendency to contaminate the gyroscope components with the explosive residue, thus impairing the gyroscope's performance. In addition, this type of gyroscope cannot be pretest fired so that performance characteristics can be accurately predicted prior to the gyroscope's operational use. On the other hand, while spring driven units do not have any of the undesirable characteristics of either the electrically driven or explosive type gyroscopes, they do have a serious drawback in reliability. Under high inertial accelerations, as encountered in most advanced guided missiles, the peformance of the spring driven gyroscope has a tendency to degrade.

In general, the gyroscope of the present invention is a self-contained unit. A fluid under pressure is stored within the gyroscope housing and a hollow rotor element. In operation, the fluid is released to the atmosphere and flows through nozzles in the hollow rotor. The reaction of the fluid flow on the rotor causes the rotor to accelerate. After the rotor accelerates to a predetermined speed, a caging mechanism releases a gimbal allowing the gyroscopic instrument to provide reference directional signals. The gyroscope rotor continues to coast for a relatively long period e.g., five minues at a speed sufficient to provide reliable signals.

It is therefore an object of the invention to provide an improved gyroscope capable of reaching a predetermined speed in a relatively short period of time.

It is a further object to provide a gyroscope with simplified construction for economical manufacture.

Furthermore, it is an object of the invention to provide a gyroscope that is actuated after the time of missile launching.

It is a further object of the invention to provide a gyroscope free of contamination in operation.

It is a further object of the invention to provide a gyroscope that is pretestable.

It is a further object of the invention to provide a gyroscope that is reliable in operation and performance.

In accordance with the invention, there is provided a gyroscope. The gyroscope includes a housing means and a rotor means supported in the housing means for rotation about an axis. Potential energy means are provided within the rotor means. Release means are coupled to the energy means for controlling the release of the energy to actuate the rotor means for rotation about the axis and provide the gyroscope.

For a better understanding of the present invention, together with other and further objects thereof, reference is made to the following description taken in connection with the accompanying drawings and its scope will be pointed out in the appended claims.

*Principles of operation*

The gyroscope of the present invention has as one of its unique features, a potential energy source stored within a hollow rotor. Although many energy sources may be stored in the rotor such as chemical, mechanical, nuclear, electrical, magnetic, etc., in the preferred embodiment a compressible fluid is stored within the rotor as a potential energy source.

Figure 1:
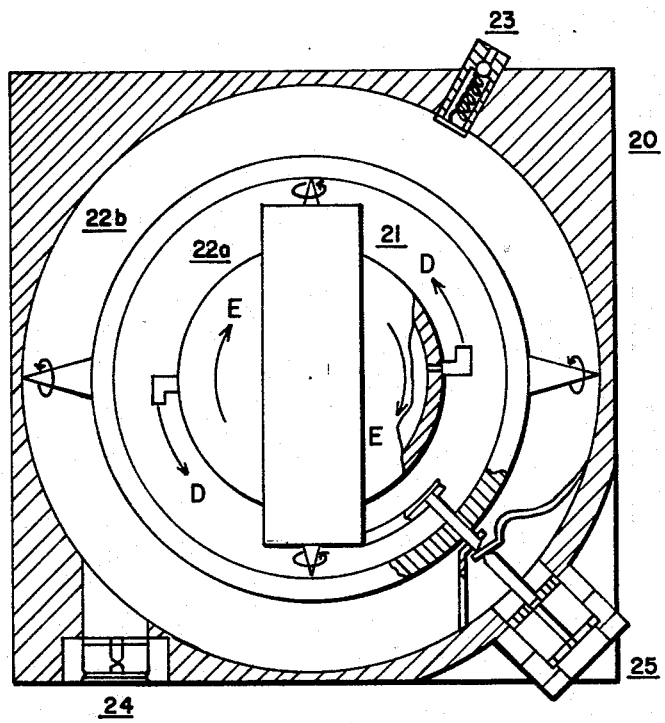
FIG. 1 is a schematic drawing illustrating a gyroscope made in accordance with the present invention.

Referring now to FIG. 1 of the drawings there is shown a schematic drawing illustrating a gyroscope embodying the present invention. The gyroscope generally includes a housing 20, a hollow rotor 21, gimbals 22a and 22b, a charging valve 23, a fluid releasing mechanism 24, and a caging mechanism 25. A compressible fluid under pressure (e.g., dry nitrogen at 1000 p.s.i.) is introduced into housing 20 through the charging valve 23. The fluid entering the charging valve flows through orifices in the rotor 21 to a hollow chamber within the rotor. After filling, the gyroscope is sealed for storage.

To initiate rotor rotation, the release mechanism 24 is energized. Energization of release mechanism 24 causes a large opening to be made in the housing 20. The opening in the housing enables fluid to flow from the interior of the housing to the atmosphere. The fluid flow causes a drop in pressure in the area surrounding the rotor and thus produces a differential pressure across the rotor walls. The differential pressure between the rotor interior and the housing enables fluid to flow from the interior of the rotor through orifices communicating with the rotor and the housing as shown by arrows D in FIG. 1. The latter fluid flow being restricted occurs at a slower rate than the fluid flowing through release mechanism 24. The reaction of the fluid flowing through the orifices causes rotor 21 to be accelerated in the direction shown by the arrows E in FIG. 1. While the rotor is being accelerated, the gimbals and the rotor are maintained in a fixed position by a caging mechanism 25. When the rotor reaches a predetermined speed, the caging mechanism is released and the gyroscope operates to furnish position indication signals in the conventional manner.

Figure 2:
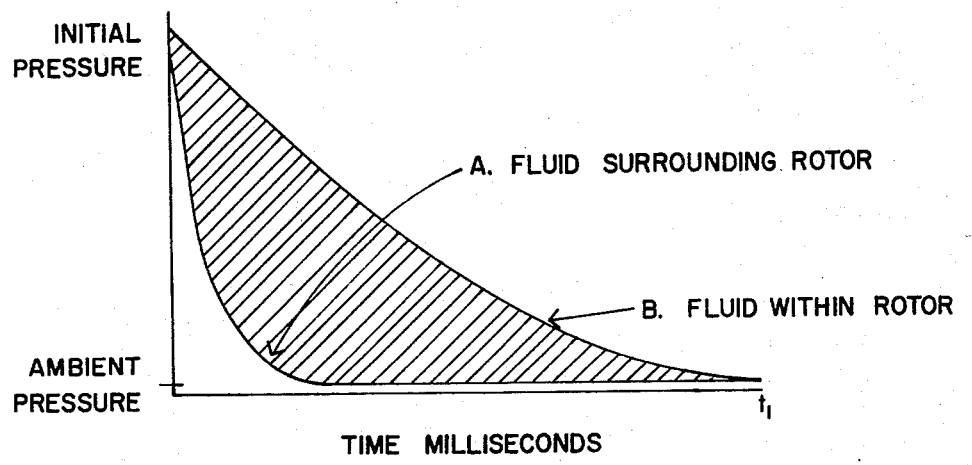
FIG. 2 is a graph of pressure vs. time for a gyroscope embodying the present invention.

Referring now to FIG. 2 of the drawings there is shown typical pressure vs. time curves for the fluid within the gyroscope embodying the present invention. Curve A in FIG. 2 is representative of the pressure drop in fluid surrounding the rotor, while curve B is representative of the pressure drop of the fluid within the rotor chamber. As can be seen in FIG. 2, the pressure of the fluid within the rotor drops to ambient pressure in a relatively long period of time (e.g., 500 milliseconds) while the pressure of the fluid surrounding the rotor drops to ambient in a relatively short period of time.

Figure 3:
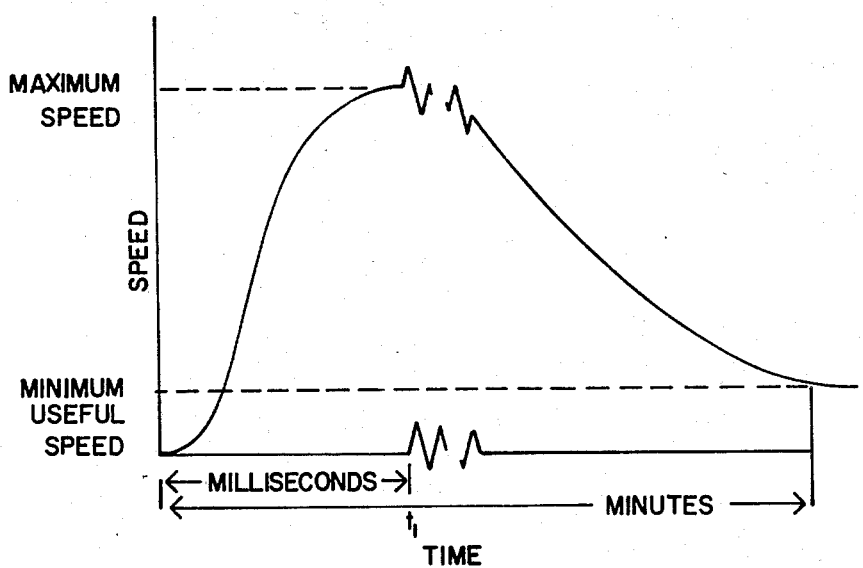
FIG. 3 is a graph of rotor speed vs. time for gyroscope embodying the present invention.

Referring now to FIG. 3 of the drawings, there is shown a typical curve of rotor speed vs. time for a gyroscope embodying the present invention. As can be seen in FIG. 3 the rotor reaches a maximum speed in a relatively short period of time (e.g. 500 milliseconds) and is uncaged. The rotor continues to rotate at sufficient speeds for providing gyroscopic action for a relatively long period of time (e.g. 5 minutes).

*Detailed description*

Figure 4:
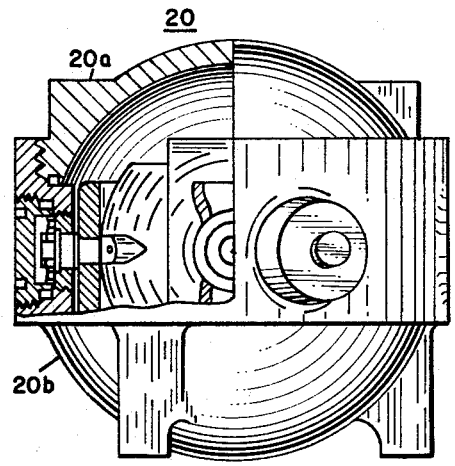
FIG. 4 is a side elevation, partly in section of a preferred embodiment of a gyroscope made in accordance with the present invention.

Referring now in more detail to the drawings and with particular reference to FIG. 4 there is here illustrated a side elevation, partly in section, of a preferred embodiment of a gyroscope made in accordance with the present invention. The gyroscope is contained within a housing 20 of general spherical shape. As can be seen in FIG. 4, the housing 20 includes an upper half 20a threadedly connected to a lower half 20b. The distance between the outer periphery of housing 20 and its inner wall is chosen in accordance with the internal fluid pressure the housing will have to withstand, and the particular material selected for fabricating the housing. In the preferred embodiment, the housing material is an aluminum alloy but a wide variety of alternate material such as steel, brass, or magnesium alloys may also be utilized.

Figure 5:
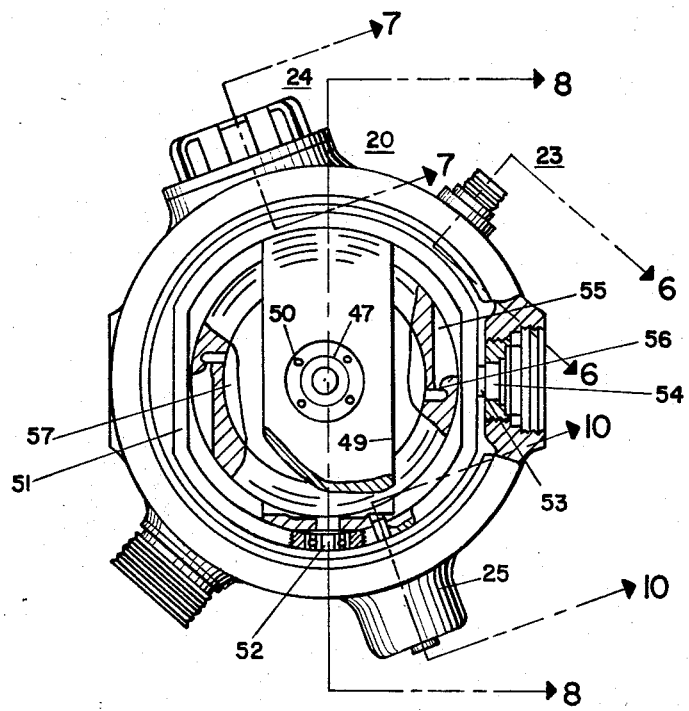
FIG. 5 is a plan view partly in section, of the gyroscope shown in FIG. 4 with its cover removed.

Referring now to FIG. 5, there is here illustrated a plan view, partly in section, of the gyroscope shown in FIG. 4 with its cover removed. As shown in FIG. 5, the housing 20 is provided with a charging valve 23 mounted in its wall. Charging valve 23 enables filling the gyroscope with a fluid under pressure.

Figure 6:
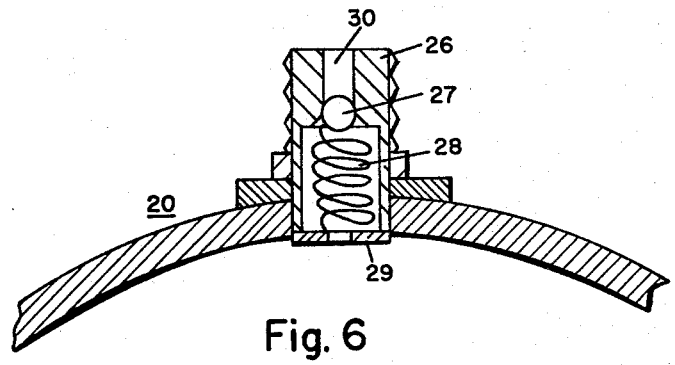
FIG. 6 is a sectional view of a charging valve taken along the line 6—6 in FIG. 5.

Referring now to FIG. 6, there is here illustrated an enlarged sectional view of the changing valve 23 taken along the line 6—6 in FIG. 5. As can be seen in FIG. 6, the charging valve includes a valve casing 26 of general cylindrical shape. The valve casing has an opening therein for communicating with a fluid pressure filling apparatus. After filling, sealing of the charging valve is provided by a ball seal 27 mounted on a spring 28. Spring 28 is retained in the valve casing 26 by a circular rim 29 which extends into a central opening 30 in the valve casing 26. There are thus provided filling means in the housing to enable filling the housing with a fluid under pressure in the form of a valve casing 26 having an aperture 30 therein. In addition, means for sealing the charging valve to retain the fluid under pressure are thus provided in the form of circular rim 29, spring 28, and ball seal 27.

Referring, once again, to FIG. 5, the gyroscope housing is shown with a release mechanism 24 mounted in its wall. The release mechanism is provided for releasing the fluid under pressure stored within the gyroscope to a low pressure area (i.e., the atmosphere).

Figure 7:
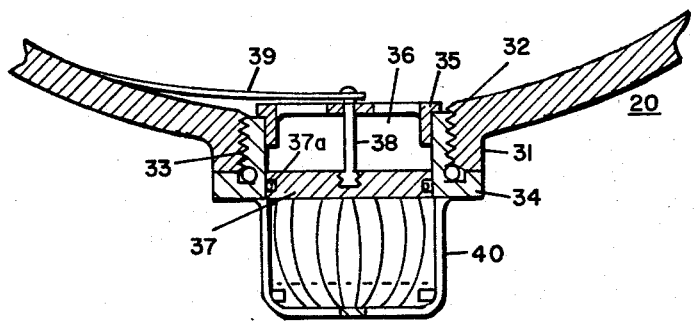
FIG. 7 is a sectional view of a release mechanism taken along the lines 7—7 in FIG. 5.

Referring now to FIG. 7, an enlarged, sectional view of the release mechanism taken along the line 7—7 in FIG. 5 is shown. As can be seen in FIG. 7, the housing 20 has a circular boss 31 extending from its outer periphery. Circular boss 31 has an aperture 32 therein substantially as shown. The interior of the wall formed by aperture 32 and circular boss 31 is internally threaded as shown at 33. A retainer 34 of general cylindrical shape is threaded to circular boss 31 as shown at 33. A cylindrical flange collar 35 having an outer diameter substantially equal to the internal diameter of retainer 34 is supported by the retainer 34 on its flanges as shown. Collar 35 has circular openings 36 therein for allowing the fluid under pressure to flow from the interior of the housing to the atmosphere during operation. A piston seal 37 is disposed within retainer 34 and has an O ring seal 37a around its periphery for sealing the fluid under pressure within the housing. Piston seal 37 is coupled to and supported by collar 35 by means of a fusible link 38. The fusible link 38 is threadedly connected to piston seal 37 and soldered to the collar 35. An electrical conductor 39 is connected to fusible link 30, and an external source not shown. An electrical current passing through conductor 39 causes fusible link 38 to melt allowing the piston seal 37 to be released due to pressure forces acting on its face thus providing a release means for releasing the potential energy stored within the housing. After release, piston seal 37 is retained in a basket like structure 40 welded to retainer 34. The cross sectional area of the openings 36, aperture 32 and the openings in the basket structure 40 are determined by the internal pressure of the fluid and the time desired to allow the pressure within the housing to drop.

Referring now in FIG. 1, a hollow rotor 21 is supported in the gyro housing 20 by the gimbals 22a and 22b for rotation about an axis of spin.

Figure 8:
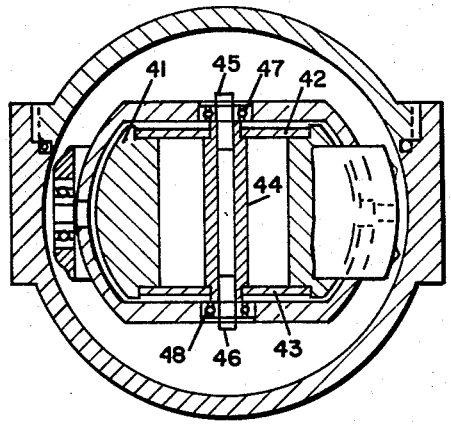
FIG. 8 is a sectional elevation view of the gyroscope of FIG. 4 taken along the line 8—8 in FIG. 5.

A detailed sectional view taken along the line 8—8 in FIG. 5 is shown in FIG. 8. Referring now to FIG. 8, rotor 21 includes an annular ring 41 for providing the inertia necessary for gyroscopic action. The annular ring 41 has an outer periphery of generally spherical shape and is preferably made of an aluminum alloy. Alternate material such as brass, steel and tungsten alloys may also be employed. Two parallel circular plates 42 and 43 are welded to annular ring 41 along its edges. These plates lie in parallel planes perpendicular to the axis of revolution of the annular ring 41. In operation, annular ring 41 is rotatable about its axis of revolution. The axis of revolution of annular ring 41 will hereinafter be referred to as the axis of spin. Coupled to the plates 42 and 43 is a hollow rotor shaft 44 having a center line coincident with the axis of spin. Bearing pins 45 and 46 are coupled to shaft 44 by means of an interference fit. In addition, bearing pins 45 and 46 are pivotally mounted in the rotor bearings 47 and 48 to permit rotation of the annular ring 41 about the axis of spin.

Referring now to FIG. 5, rotor bearings 47 and 48 have flange ends (not shown) and are connected to an inner gimbal ring 49 by screws 50. The inner gimbal ring 49 is pivotally coupled to an outer gimbal ring 51 by diametrically opposed bearings and pins 52. The center lines of the bearing and pin assembly are aligned so as to allow pivotal motion of the inner gimbal about an axis perpendicular to the axis of spin. The outer gimbal ring 51 is pivotally coupled to housing 20 by diametrically opposed bearing pins 53 and bearings 54. The center lines of the outer gimbal bearings are orientated perpendicular to the inner gimbal bearing center line and the axis of spin.

While the invention has hereinabove been described in terms of a two degree of freedom gyroscope. The invention is also applicable to a single degree of freedom gyroscope. For example, by eliminating the outer gimbal and its associated bearings and bearing pins and pivotally mounting the inner gimbal ring 49 to the housing the gyroscope shown in the drawings would be a single degree of freedom gyroscope.

Referring now to FIG. 5, one of the unique features of this invention is directed to the means of accelerating the rotor 21. Referring now to FIG. 5, rotor 21 is provided with impeller means in the form of passageways 55 and orifices 56 communicating with the interior and exterior chambers of the rotor. In operation, the fluid flowing through these orifices causes the rotor to rotate about its axis of spin. In the preferred embodiment, the rotor has two diametrically opposed orifices 56 communicating with the housing and the rotor interior chambers 57 through fluid passageways 55 respectively. The orifices 56 are diametrically opposed with their exits orientated in opposite directions as shown. The orifices are disposed so the maximum torque is imparted to the rotor by reaction of the fluid flowing through the orifices. Although any number of orifices may be used, it is preferred to use an even number of diametrically opposed orifices to minimize loading of the rotor bearings 47 and 48. The internal diameter and shape of the orifices and passageways are of critical importance and are determined by the internal pressure within the rotor chamber 57, the desired rate of fluid flow and the desired rotor speed.

Figure 9:
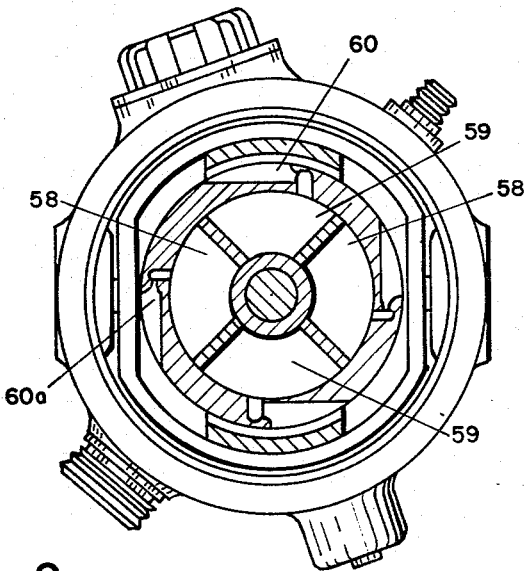
FIG. 9 is a plan view partly in section of a modification of the present invention.

Another embodiment of the present invention is shown in FIG. 9. Since the device as shown in FIG. 9 is generally similar to that of FIG. 5 corresponding elements are indicated by identical reference numerals. In this embodiment, the rotor is shown as provided with more than one pair of orifices. The interior of the rotor is shown as being divided into diametrically opposed compartments 58 and 59. Each pair of diametrically opposed compartments have different diameter orifices. As can be seen in FIG. 9, orifices 60 have a larger diameter than the orifices 60a. In this embodiment fluid flowing through both pairs of orifices simultaneously provide the initial driving force for accelerating the rotor. Fluid flowing through the chambers having the smaller orifices, will continue to flow after the other chambers are exhausted. This flow will continue to provide a torque to the rotor and maintain its speed above the required minimum. The additional torque will counteract various losses such as bearing, friction and windage loss.

In order for signals furnished by the gyroscope to be useful, they must be references to fixed axes. Therefore, the axis of spin and gimbals are kept in a fixed position during storage and acceleration. This locking of the components is commonly referred to as "caging." Referring now to FIG. 5, there is shown a caging mechanism 25 mounted on the gyroscope housing 20.

Figure 10:
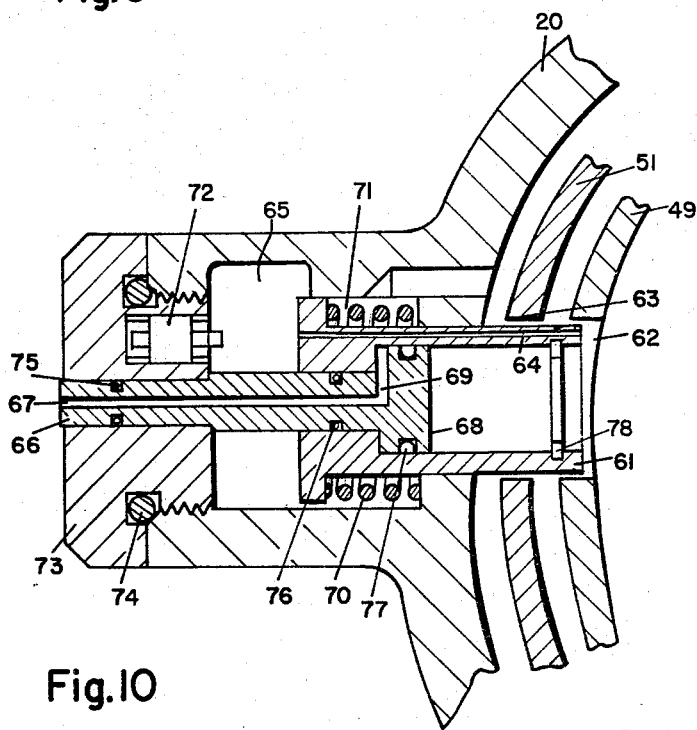
FIG. 10 is a sectional view of the caging mechanism taken along the line 10—10 in FIG. 5.

Referring now to FIG. 10, a sectional view of the caging mechanism taken along line 10—10 in FIG. 5 is shown. In FIG. 10, the caging mechanism is shown in the "caged" position. The caging mechanism includes a locking piston 61 which is coupled to inner gimbal 49 and outer gimbal 51 through apertures 62 and 63, respectively. A fluid passageway 64 in locking piston 61 couples the housing chamber to a pressure chamber 65. A second movable piston 66 holds locking piston 61 in apertures 62 and 63 while the gyroscope is being pressurized. Piston 66 has a fluid passageway 67, therein, coupling piston area 69 with the atmosphere. Passageway 67, therefore, provides a differential pressure between piston areas 68 and 69. A resilient spring 70 in cavity 71 provides a bias force for the locking piston 61. An indicating switch 72 is mounted in cover 73 which in turn is threadedly connected to the housing 20. Switch 72 is preferably an "on-off" switch, and indicates whether the gyroscope is in the caged or uncaged condition. The switch further co-operates with the caging mechanism to indicate whether or not the pressure in the housing is above a predetermined safe level for operation. O ring seals 74, 75, 76, and 77 prevent fluid from escaping through the caging mechanism to the atmosphere while the gyroscope is in storage. The operation of the caging mechanism will be described hereinafter.

Other parts of the gyroscope, such as the pickoff means for such as the pickoff for each degree of freedom of movement are not shown. The presence of these parts in the drawing are not required for an understanding of the invention. In the preferred embodiment of the gyroscope two sets of pickoff elements are provided. One set indicates position of the inner gimbal relative to the outer gimbal and the other set indicates the position of outer gimbal relative to the housing 20. Although the pickoff will be described hereinafter in terms of a potentiometer, other types of transducers could also be used. The resistance element of one of the potentiometers is preferably circular and mounted on the outer gimbal. The contact arm is mounted on the inner gimbal. Thus, relative movement of the inner gimbal to the outer gimbal will produce a voltage proportional to a fixed reference. The resistance element of the outer gimbal pickoff is mounted on the housing and the contact arm on the outer gimbal, producing a voltage proportional to the outer gimbal position relative to the housing. An electrical connection is provided for picking off signals from the potentiometer sets and is affixed to the housing.

*Operation*

Referring now to FIG. 4, the assembled gyroscope is filled with a fluid under pressure through the charging valve 23. In the preferred embodiment of the invention the fluid used is dry nitrogen at a pressure of approximately 1,000 pounds per square inch at ambient temperature. Five or ten percent helium may be mixed with the nitrogen for the purpose of performing periodic mass spectrometer analysis during the storage period. The presence of helium provides a simple, efficient, and inexpensive method of extrapolating the storage life of the unit. While we have described the invention as using dry nitrogen, other compressible fluids under pressure may be used for this purpose. The fluid fills the entire cavity within the housing and within the rotor and thus provides a potential energy means stored within the rotor.

Referring now to FIG. 7, operation of the gyroscope is started by passing an electrical current (e.g. five amperes at 10 to 28 volts D.C. for approximately ten milliseconds or less) through conductor 39 to fusible link 38. This electrical current causes the link 38 to melt. The internal pressure acting on the surface of the piston seal 37 causes the member to be released into the basket 40. The fluid under pressure rushes through the relatively large opening 36 to the atmosphere. The sudden drop in pressure in the housing creates a differential pressure between the housing and the rotor cavity causing fluid to flow through the nozzles in the rotor. The reaction of the fluid flow on the rotor applies a torque to the rotor thus causing it to accelerate.

Referring now to FIG. 10, in order to maintain the gyro caged during the filling operation, piston 66 of the caging mechanism is moved to the right prior to filling. In its extreme position it bears on a snap ring 78 coupled to the locking piston 61 and holds the piston so that the inner and outer gimbals are locked. As the filling operation proceeds the fluid pressure in pressure chamber 65 gradually reaches the pressure in the housing. As the pressure in pressure chamber 65 reaches system pressure, the net force acting on its rear face is sufficient to overcome the biasing force of spring 70, so that locking member 61 will hold the gimbals in a caged position. When the unit is entirely pressurized the piston member 66 is released and moves to the left thus returning to the position in FIG. 10.

The caging mechanism 25 starts operating to uncage the gimbals simultaneously with the release of the fluid under pressure from the gyroscope housing. Referring now to FIG. 10, as the fluid pressure in the housing rapidly decreases there is a gradual decrease in pressure in chamber 65 due to the restricted fluid flow through passage 64. As the pressure in chamber 65 continues to drop the bias force of the spring 71 causes the locking member 61 to move to the left. The timing sequence is predetermined so that the gimbal will not be in the uncaged position until the rotor is at its maximum speed. At this point member 61 will be in the extreme left hand position. In this position, the caging indicating switch 72 is actuated providing a signal indicating that the gimbals are uncaged.

When the rotor reaches its maximum angular velocity and all the fluid in its interior chamber is discharged the rotor coasts freely for a period of time sufficient to furnish valid reference signals.

As can be seen from the above description and the drawings, the gyroscope made in accordance with the present invention is an inexpensive self-contained unit. In addition, the gyroscope can achieve operational speeds in a relatively short period of time. The gyroscope, furthermore, is a reliable unit in that it can be tested and re-tested prior to its use. The only part of the unit that is destroyed in operational tests is the fusing link in the releasing mechanism assembly. In addition, the gyroscope is capable of a relatively long storage life.

Although the invention has been described as being utilized in a gyroscope, it has many other useful applications. By way of example, it may also be used as a self-contained prime mover.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:
1. A fluid actuated gyroscope comprising:
 (a) a housing,
 (b) a hollow rotor,
 (c) means supporting said rotor within said housing for rotation therein about an axis of spin,
 (d) a reaction impellor including means forming an aperture communicating between the interior and exterior of said rotor,
 (e) a release valve coupling the interior and exterior of said housing for the release of said fluid from within said housing to a low pressure area in the exterior thereof,
 (f) said housing containing a fluid having a pressure substantially greater than the pressure in said low pressure area,
 (g) whereby upon the opening of said release valve fluid flows therethrough from the interior of said rotor by way of said impellor and flow of said fluid through said impellor actuates said rotor for rotation about said axis.

2. The combination defined in claim 1 including a filling valve coupling the interior and exterior of said housing to permit the filling of said housing with a fluid under pressure.

3. A fluid actuated gyroscope comprising:
 (a) a housing,
 (b) a hollow rotor disposed in said housing and including at least four chambers,
 (c) means supporting said rotor for rotation about an axis of spin,
 (d) said rotor including impellor means having first and second pairs of diametrically opposed fluid passageways and orifices coupling the respective chambers with the exterior of said rotor,
 (e) said first orifices being of larger diameter than said second orifices for controlling flow of a fluid under pressure through said impellor means at different rates, and
 (f) release means comprising a valve coupling the interior and exterior of said housing and thereby controlling the release of said fluid from within said housing to a low pressure area,
 (g) said housing containing a fluid having a pressure substantially greater than the pressure in said low pressure area,
 (h) whereby said valve cooperates with said passageways and orifices in providing flow of said fluid from the interior of said rotor, with concomitant actuation of said rotor by said impellor means for rotation about said axis.

4. A gyroscope comprising:
 (a) a housing,
 (b) a rotor supported in said housing for rotation therein about an axis of spin,
 (c) fluid storage means including means forming a chamber within said rotor,
 (d) throttling means for restricting the flow of fluid from said chamber to the exterior of said rotor within said housing, and
 (e) said throttling means being so disposed and oriented as to apply a moment to said rotor about said axis upon the flow of fluid therethrough,
 (f) a fluid in the interior of said housing having a pressure substantially greater than the pressure in a region exterior of said housing,
 (g) and release means being arranged to initiate flow of said fluid from the interior of said housing to said region by way of said throttling means.

5. The combination defined in claim 4 including a gas in said storage means having a pressure substantially greater than the atmospheric pressure in the exterior of said housing.

6. A gyroscope comprising:
 (a) a sealed housing,
 (b) a rotor,
 (c) means supporting said rotor within said housing for rotation with respect to said housing about a spin axis,
 (d) turbine means on said rotor oriented to rotate said rotor about said spin axis,
 (e) pressure release means communicating between the interior of said housing and the exterior thereof,
 (f) a fluid contained by said housing and having a pressure substantially greater than the pressure in the exterior of said gyroscope,
 (g) said turbine means defining a portion of the path of fluid flowing toward said release means,
 (h) said turbine means imparting to said rotor a torque about said axis upon said flowing of said fluid.

7. The combination defined in claim 6 in which said rotor is hollow and said turbine means comprises an orifice between the interior and exterior of said rotor, said orifice imposing a greater restriction than said pressure release means on the flow of said fluid.

8. A gyroscope comprising:
 (a) a sealed housing,
 (b) a rotor,
 (c) means supporting said rotor in said housing for rotation about a spin axis,
 (d) said housing containing a fluid having a substantially greater pressure than the pressure in the exterior of said housing, (e) turbine means on said rotor oriented to rotate said rotor about said axis,
(f) a fluid release valve communicating between the interior and exterior of said housing,
(g) said turbine means defining a portion of the path of fluid flowing toward said release means,
(h) said turbine means including throttling means in said path,
(i) said throttling means imposing a greater restriction than said release valve on the flow of fluid therethrough,
(j) whereby upon actuation of said release valve fluid flows along said path and interacts with said turbine means to cause rotation of said rotor.

9. A gas driven gyro comprising a gas tight casing, gimbal means rotatably supported within said casing, a hollow rotor supported within said casing by said gimbal means for rotation about a rotor axis, jet orifice reaction means in said rotor and connecting the interior and exterior of said rotor, means for charging the interior of said casing and of said rotor with high pressure gas, means for selectively reducing the interior pressure in said casing exteriorly of said rotor at a rate to provide a pressure differential across said orifice means and drive said rotor, said reducing means comprising a normally closed passage means for connecting the interior of said casing with a space external of said casing containing a low external discharge pressure, the discharge rate of said passage means being greater than the discharge rate of said orifice means in order to produce said pressure differential across said orifice means, and means for opening said passage means in response to a command signal, wherein said gimbal means comprises a band surrounding said rotor and a shaft extending through said band for supporting said rotor for rotation within said band and about the axis of said shaft defining said rotor axis.

10. A gas driven gyro as defined in claim 9 wherein said rotor comprises a relatively heavy central ring and light end shells secured together by said shaft means, said heavy center ring providing the major moment of inertia of said rotor.

References Cited by the Examiner

UNITED STATES PATENTS

| | | | |
|---|---|---|---|
| 741,683 | 10/1903 | Leavitt | 74—5.12 X |
| 954,634 | 4/1910 | Jones | 74—5.12 |
| 1,077,344 | 11/1913 | Hennig | 74—5.12 |
| 2,175,143 | 10/1939 | Cornelius | 74—5.14 |
| 2,200,976 | 5/1940 | Bates | 74—5.14 X |
| 2,415,899 | 2/1947 | Meyer et al. | 74—5.12 |
| 2,688,805 | 9/1954 | Annen | 74—5.7 |
| 2,721,418 | 10/1955 | Peabody | 46—67 |
| 2,732,721 | 1/1956 | Summers | 74—5.12 X |

FRED C. MATTERN, JR., *Primary Examiner.*

SAMUEL SPINTMAN, BROUGHTON G. DURHAM,
*Examiners.*

T. W. SHEAR, K. DOOD, P. W. SULLIVAN,
*Assistant Examiners.*